United States Patent

Mills, Jr. et al.

[11] 3,891,195
[45] June 24, 1975

[54] CUTTING-WELDING TORCH

[75] Inventors: Justin W. Mills, Jr., Cinnaminson, N.J.; Mark H. Betzler, Wilkes-Barre, Pa.

[73] Assignee: Lif-O-Gen, Inc., Cambridge, Md.

[22] Filed: May 14, 1974

[21] Appl. No.: 469,842

[52] U.S. Cl. .......... 266/23 P; 266/23 R; 239/424.5; 239/600; 148/9
[51] Int. Cl. .............................................. B23k 7/02
[58] Field of Search ............ 148/9; 266/23 R, 23 P, 266/23 T; 239/424.5, 600

[56] References Cited
UNITED STATES PATENTS

| | | | |
|---|---|---|---|
| 1,259,885 | 3/1918 | McGee | 239/600 |
| 1,357,324 | 11/1920 | Johanson | 239/600 X |
| 2,518,895 | 8/1950 | Jacobsson et al. | 239/600 X |
| 3,648,934 | 3/1972 | Goss | 239/600 X |

Primary Examiner—Roy Lake
Assistant Examiner—Paul A. Bell
Attorney, Agent, or Firm—Howson and Howson

[57] ABSTRACT

A cutting-welding torch wherein all of the oxygen and fuel valves including the high pressure oxygen control for cutting are incorporated in the torch handle assembly. The high pressure cutting oxygen passage in the handle assembly is automatically blocked upon connection of a welding tip to the assembly to prevent inadvertent introduction of excess oxygen during welding usage of the torch. Upon coupling of a cutting tip to the handle assembly, the high pressure oxygen passage is opened to permit selective passage of high pressure oxygen for cutting purposes.

4 Claims, 11 Drawing Figures

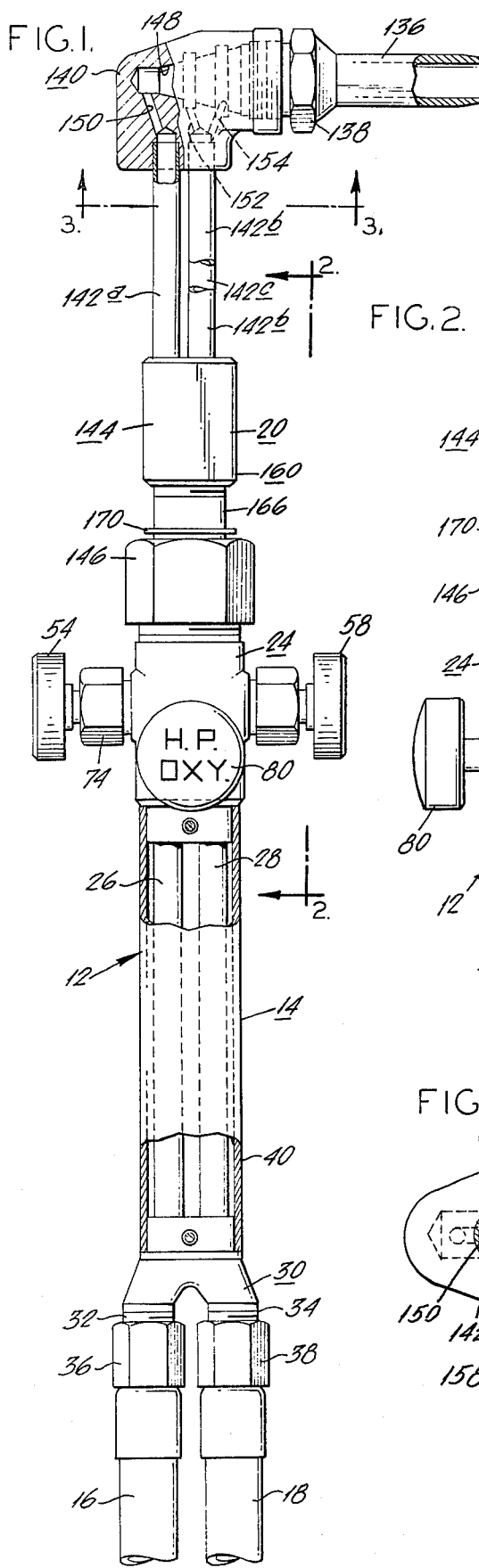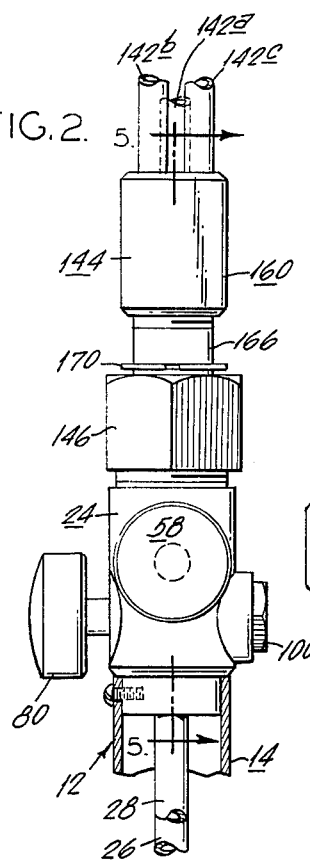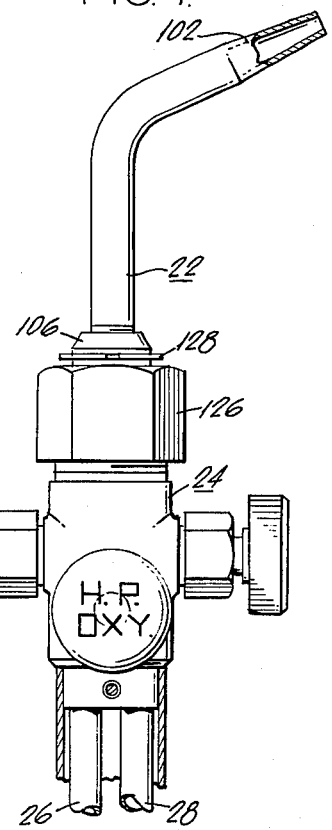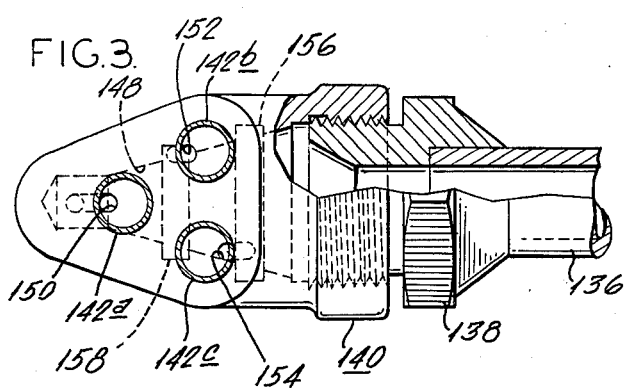

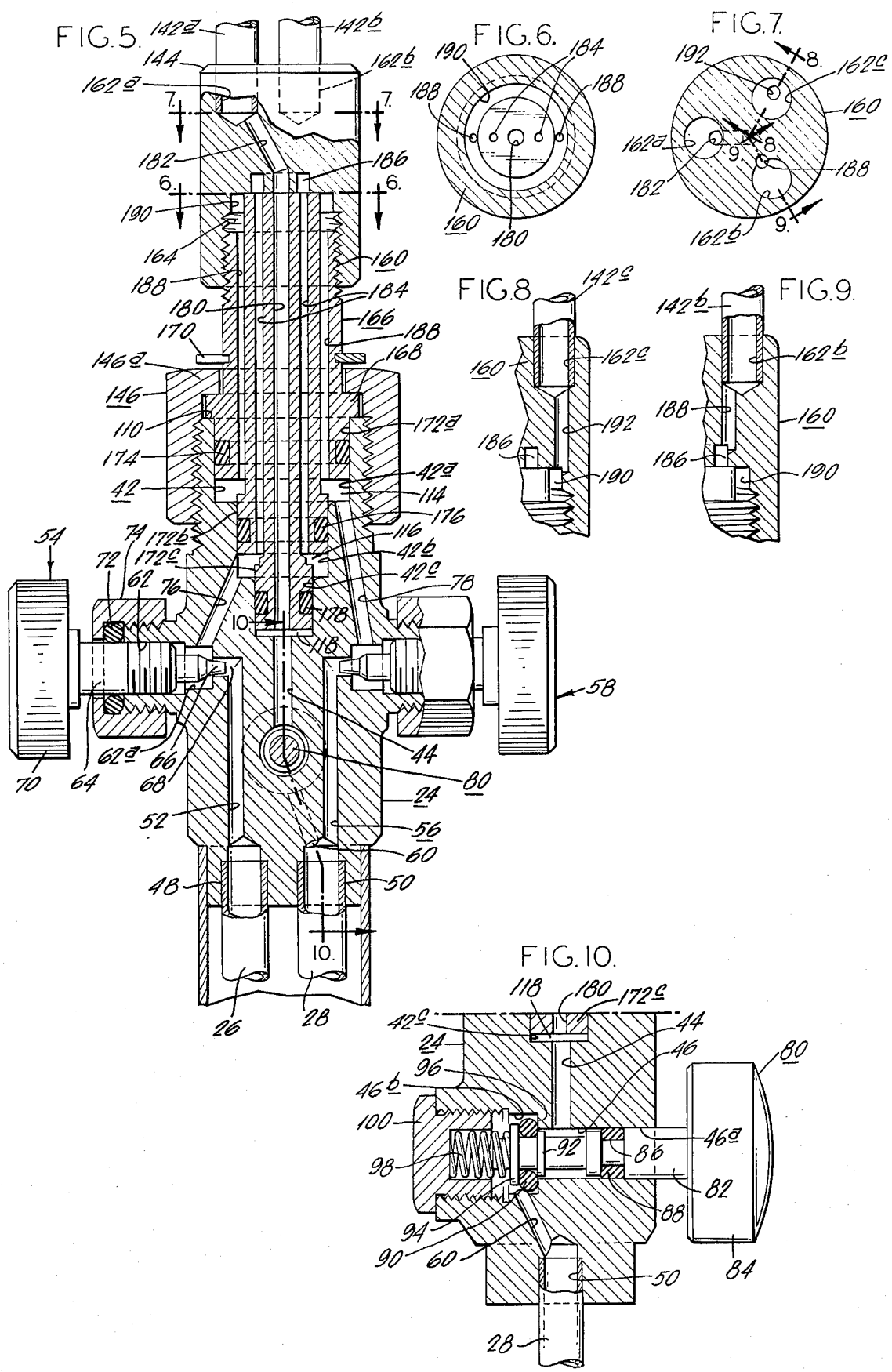

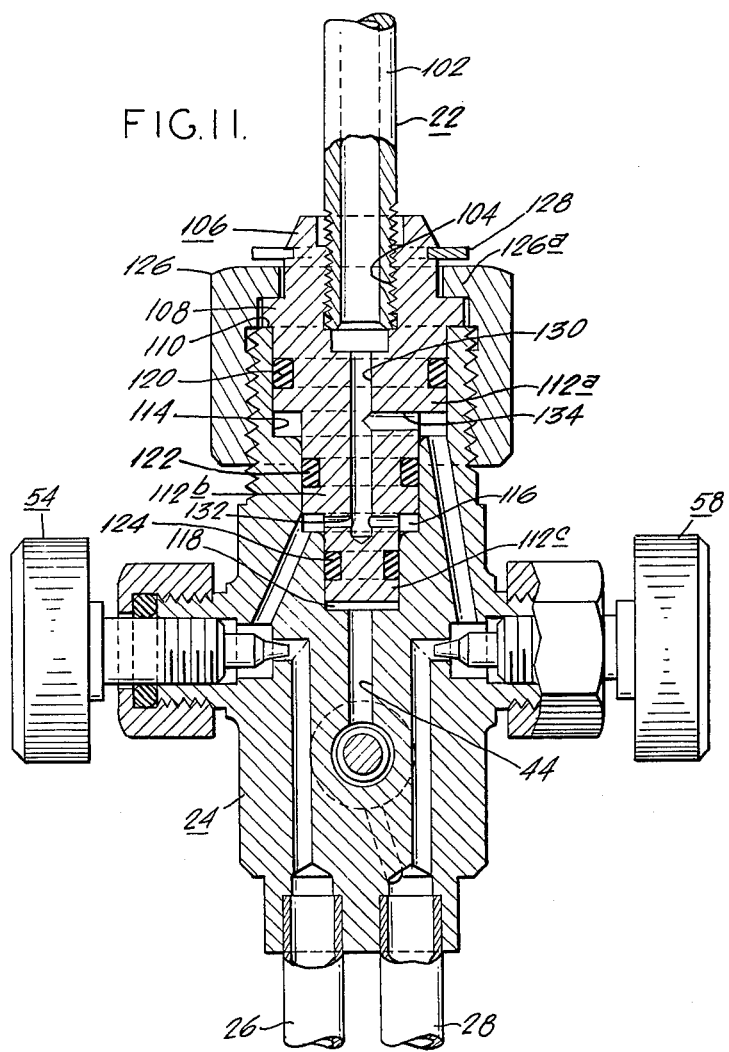

CUTTING-WELDING TORCH

The present invention relates generally to metal welding and cutting apparatus of the type which utilizes an adjustable mixture of oxygen and gaseous fuel to produce a welding or cutting flame. In particular, the invention is directed to a novel cutting-welding torch construction wherein all of the oxygen and fuel control valves are incorporated in the torch handle assembly.

The conventional welding torch which has provision for a cutting attachment is characterized by a handle assembly which includes an oxygen valve and a fuel valve for adjustment of the flow of the gases into the welding tip. For cutting, the welding tip is removed and a cutting attachment installed in its place. The conventional cutting attachment includes an additional oxygen valve and a high pressure oxygen lever.

In the present invention, a metal cutting and welding torch is provided wherein the torch handle assembly includes the usual fuel and oxygen needle valves and in addition includes a high pressure oxygen valve for use during cutting. The cutting tip accordingly does not require either an oxygen needle valve or a high pressure oxygen lever. To prevent inadvertant actuation of the high pressure oxygen valve on the handle during welding use of the torch, a novel arrangement is provided whereby the insertion of a welding tip blocks the passage from the high pressure oxygen valve, thus effectively deactivating the valve. The elimination of the second oxygen needle valve usually found on the cutting attachment simplifies the operation of the torch when used in the cutting mode and permits operation of the torch by a relatively inexperienced operator.

It is accordingly a first object of the present invention to provide a metal cutting and welding torch of a novel improved construction.

A further object of the invention is to provide a cutting and welding torch as described in which all of the gas control valves are incorporated in the torch handle.

Another object of the invention is to provide a cutting-welding torch as described wherein the high pressure oxygen control for use in cutting is located in the torch handle and wherein the passage from said high pressure oxygen control is automatically blocked upon mounting of a welding tip on the handle.

A still further object of the invention is to provide a cutting-welding torch as described of a relatively simple construction.

Still another object of the invention is to provide a cutting-welding torch as described which due to its ease of operation can be effectively used by an inexperienced operator.

Additional objects and advantages of the invention will be more readily apparent from the following detailed description of an embodiment thereof when taken together with the accompanying drawings wherein:

FIG. 1 is a longitudinal view partly broken away and in section of a cutting-welding torch in accordance with the present invention, showing the cutting tip mounted on the torch handle assembly;

FIG. 2 is a partial view partly broken away and in section taken along line 2—2 of FIG. 1;

FIG. 3 is a partial view partly in section and partially broken away taken along line 3—3 of FIG. 1;

FIG. 4 is a partial view of the torch shown in FIG. 1 but with the welding tip mounted on the handle assembly instead of the cutting tip;

FIG. 5 is an enlarged sectional view taken along line 5—5 of FIG. 2 showing the interior details of the handle assembly body and the lower end of the cutting tip;

FIG. 6 is a sectional view taken along line 6—6 of FIG. 5;

FIG. 7 is a sectional view taken along line 7—7 of FIG. 5;

FIG. 8 is a partial sectional view taken along line 8—8 of FIG. 7;

FIG. 9 is a partial sectional view taken along line 9—9 of FIG. 7;

FIG. 10 is a partial sectional view taken along line 10—10 of FIG. 5; and

FIG. 11 is an enlarged sectional view similar to FIG. 5 but with the welding tip mounted on the handle assembly instead of the cutting tip.

Referring to the drawings and particularly FIG. 1 thereof, a cutting-welding torch generally designated 12 in accordance with the present invention comprises a handle assembly 14 to the lower end of which are attached the fuel hose 16 and the oxygen hose 18. In FIGS. 1, 2 and 5, a cutting tip 20 is shown connected to the handle assembly 14 while in FIGS. 4 and 11, a welding tip 22 is shown attached to the assembly.

The handle assembly 14 comprises a body 24, connected at its lower end to the fuel and oxygen supply tubes 26 and 28. At their lower ends, the supply tubes communicate with passages within an end member 30 which in turn communicate respectively with the hoses 16 and 18 coupled to threaded fittings 32 and 34 by connectors 36 and 38 in a manner conventional to cutting-welding torches. A handle tube 40 extends between the torch body 24 and the end member 30, surrounding the supply tubes in spaced relation thereto.

The novelty of the invention resides essentially in the construction of the torch body 24 and the cooperative construction of the lower ends of the cutting attachment and welding tip. As shown in FIG. 5, the body portion 24 comprises a stepped bore 42 extending downwardly from the upper end thereof, said bore having an uppermost diameter 42a, an intermediate smaller diameter 42b, and a lowermost diameter 42c. A concentric passage 44 extends from the bore 42 to intersect the transverse valve bore 46, the function of which is described in detail below.

The fuel and oxygen supply tubes 26 and 28 are received within bores 48 and 50 at the lower end of the torch body 24. The fuel supply tube 26 communicates through bore 48 with a passage 52 leading to a fuel needle valve assembly 54, while the oxygen supply tube 28 communicates through bore 50 with a passage 56 in the torch body leading to an oxygen needle valve assembly 58. An additional passage 60 in the body connects the bore 50 and oxygen supply tube with the valve bore 46 shown in FIG. 10.

The needle valve assemblies 54 and 58 are identical and accordingly, only the fuel needle valve assembly 54 will be described in detail. The needle valve assembly 54 includes a threaded bore 62 in the body 24 within which the threaded valve stem 64 is rotatably disposed. A valve needle 66 extending concentrically from the valve stem 64 extends through the bore extension 62a into the concentric passage 68, which connects with passage 52. The walls of the passage 68 thus serve as the valve seat for the valve needle 66.

The valve stem 64 is rotated by means of knob 70 at the outer end thereof. The stem is sealed by an O-ring 72 which is held in compression by a nut 74. The gaseous fuel controlled by the needle valve 54 flows from passage 52 and 68 past the needle into bore extension 62a, thence through passage 76 into a chamber formed in bore 42. Similarly, oxygen regulated by needle valve assembly 58 flows from passage 56 into the needle valve and thence through a passage 78 into a further chamber of bore 42 as described below.

As shown most clearly in FIG. 10, a high pressure oxygen valve assembly generally designated 80 is incorporated in the body 24 for providing a selective flow of high pressure oxygen from the passage 60 into the passage 44. The valve assembly 80 includes the transverse bore 46 in the body which comprises a small diameter portion 46a and a larger diameter portion 46b. The passage 44 opens into the bore portion 46a, while the passage 60 opens into the bore portion 46b. A valve stem 82 is slidably mounted within the bore 46 with one end extending outwardly from the body and terminating in a button 84. A groove 86 in the valve stem accommodates an O-ring 88 to seal the righthand end of the bore 46 as viewed in FIG. 10. A second O-ring 90 is retained between annular lands 92 and 94 on the stem and cooperates with the shoulder 96 formed between bore portions 46a and 46b to serve as a valve controlling oxygen flow between bore portions 46b and 46a. A spring 98 in compression between the land 94 and nut 100 threadedly secured within the bore 46b urges the valve stem to the right, compressing the O-ring 90 against the shoulder 96 and preventing flow of oxygen from the passage 60 into the passage 44. By depressing the button 84, the valve stem is moved to the left against the force of the spring, thereby moving the O-ring 90 away from shoulder 96 and permitting oxygen flow from passage 60 and bore 46b into bore 46a and the passage 44.

The welding tip 22 which is shown in FIGS. 4 and 11 of the drawings is mounted on the body 24 when the torch is to be used for welding purposes. The welding tip 22 comprises the tubular tip element 102, the lower end of which is threadedly secured within the threaded bore 104 of the mixer 106. A flange 108 of the mixer seats on the upper end 110 of the body 24, and the stepped cylindrical mixer surfaces 112a, 112b and 112c are adapted to respectively slidably fit within the bore diameters 42a, 42b and 42c of the body bore 42. The mixer cylindrical surfaces do not extend the full depth of the bore portions so that annular chambers 114 and 116 and the cylindrical chamber 118 are formed as shown in FIG. 11. Slots in the mixer cylindrical portions 112a, 112b and 112c accommodate the O-rings 120, 122 and 124 which seal the chambers 114, 116 and 118 to prevent passage of gases therebetween. The mixer 106 is secured in place on the body 24 by threaded nut 126, the flange 126a of which engages the flange 108 of the mixer. A retaining ring 128 disposed in a suitable slot in the mixer spaced above the nut 126 holds the nut captive when the welding tip is removed from the body.

A central mixing passage 130 in the mixer extends as an extension of the mixer bore 104 to a depth slightly below the chamber 116. Radial passages 132 in the mixer connect the mixing passage 130 with the chamber 116. Similarly, passage 134 connects the mixing passage 130 with the chamber 114. It will accordingly be evident, that gaseous fuel flowing from the needle valve 54 through passage 76 into chamber 116 will pass through passages 132 into the lower end of the mixing passage 130. The oxygen controlled by the needle valve 58 will flow through passage 78 into chamber 114 and then through passage 134 into the mixing passage 130 where mixing takes place with the gaseous fuel. The combustible gaseous mixture passes through the tip element 102 and is ignited at the end thereof.

It should be noted that the welding tip closes and seals the chamber 118 at the lower end thereof, thus preventing high pressure oxygen from passing into the welding tip should the high pressure oxygen button 84 be inadvertently depressed during a welding operation.

The cutting tip 20 as shown in FIGS. 1 and 5–9, includes a tubular cutting tip element 136 which is secured by a nut 138 to a cutting head 140. Three parallel tubes 142a, 142b and 142c are secured within bores in the bottom face of the head 140 and extend downwardly to the connector assembly 144 which is secured to the body 24 by the nut 146. The tube 142a carries high pressure oxygen to the back end of a conical shaped bore 148 in the head 140, being connected thereto by means of the passage 150. Similarly, the tube 142b carries fuel regulated by needle valve 54 to the middle of the bore 148, being connected thereto by passage 152. Tube 142c carries oxygen regulated by needle valve 58 to the forward end of the bore 138 through passage 154. The passages 152 and 154 connect substantially tangentially with annular grooves 158 and 156 in the bore 148 to facilitate a mixing of the gases in the cutting head.

As shown in FIG. 5, the connector assembly 144 includes a connector nut 160 having bores 162a, 162b and 162c therein as shown in FIG. 7 for receiving the tubes 142a, 142b and 142c respectively. The connector nut 160 includes a threaded bore 164 in the lower end thereof which is adapted to threadedly engage the upper end of the connector body 166. The connector body includes a flange 168 which seats on the upper end 110 of the body 24. The nut 146 includes a flange 146a which engages the flange 168 to secure the connector body to the handle assembly body. A retaining ring 170 is disposed in an annular slot in the connector body spaced above the nut 146 to retain the nut in position adjacent the flange 168.

The portion of the connector 166 which fits within the stepped bores 42a and 42b of the body 24 is virtually identical with that of the welding tip mixer 106. The connector body 166 includes stepped cylindrical surfaces of decreasing diameter 172a, 172b and 172c which slidably respectively engage the bore portions 42a, 42b and 42c of the body 24. The chambers 114, 116 and 118 described in conjunction with the mounting of the welding attachment are similarly formed upon mounting of the cutting tip by the failure of the connector body stepped portions to fully fill the stepped portions of bore 42. O-rings 174, 176 and 178 disposed in slots in the respective surfaces 172a, 172b and 172c of the connector body provide a sealing isolation of the chambers 114, 116 and 118.

A central axial passage 180 extends through the connector body 166, connecting the chamber 118 at the lower end thereof with a passage 182 in the connector nut 160 leading into the bore 162a thereof and the tube 142a. High pressure oxygen when admitted by the high pressure oxygen valve 80 will thus flow through passage 44, chamber 118, passage 180, passage 182, bore 162 into tube 142a, thence into the cutting head 140 through passage 150 and into the conical mixing bore 148.

As shown in FIG. 6, a pair of passages 184 in the connector body 166 extend between annulus 186 in the nut 160 and the chamber 116 in the body 24 into which the gaseous fuel flows. As shown in FIG. 9, a passage 188 connects the annulus 186 with the bore 162b in the nut 160. The gaseous fuel as regulated by the needle valve assembly 54 thus travels through passage 76 into chamber 116, thence through passages 184 into annulus 186, passage 188, bore 162b, and tube 142b into the cutting head 140.

A similar arrangement is provided for the flow of oxygen from the needle valve assembly 58. Bores 188 in the connector body 166 extend between the chamber 114 in the body 24 and the annular chamber 190 formed in the upper end of the threaded bore 164 of the nut 160. As shown in FIG. 8, passage 192 connects the chamber 190 with the bore 162c in the nut 160 to complete the oxygen passage from the needle valve 58 to the tube 142c.

For operation, the fuel and oxygen hoses 16 and 18 are connected to the end member 30 and at their opposite ends to a regulated source of gaseous fuel and oxygen. If the torch is to be used for metal cutting, the cutting tip 20 is attached to the body 24 by means of nut 146. With the oxygen needle valve 58 closed, the fuel valve 54 is opened and the fuel gas is ignited. The oxygen needle valve 54 is then opened slowly and both the fuel and oxygen needle valve are adjusted to produce the desired preheat flame. For cutting, the metal is heated using the preheated flame until it begins to melt, at which point the high pressure oxygen button 84 is depressed to provide an oxidizing flame and a cutting of the metal. When the cutting is completed, the button 84 is released to restore the preheat flame. The torch is extinguished in the usual manner by first closing the fuel valve 54 and then the oxygen valve 58.

For welding use, the welding tip 22 is attached to the body 24 by nut 126. The torch is then ignited in the manner described above and the needle valve adjusted to produce the desired welding flame. As indicated, an inadvertent depression of the high pressure button 84 will have no effect since the chamber 118 is blocked by the lower end of the mixer 106.

It can accordingly be understood that the present cutting-welding torch provides a considerably simpler torch structure than that of the usual torch wherein the cutting attachment includes an additional oxygen needle valve as well as a cutting lever. In the present design, the placement of the high pressure oxygen control in the handle assembly eliminates the need for the second oxygen needle valve on the cutting attachment thereby decreasing the weight of the unit, and eliminating the expense of the second oxygen valve. The present torch is more readily handled by an inexperienced operator since there is no need to coordinate the two oxygen needle valves present in the conventional cutting torch set-up. The automatic blocking of the high pressure oxygen passage when the welding is installed, prevents any possibility of the welding flame being interrupted should the high pressure oxygen button be inadvertently depressed.

Manifestly, changes in details of construction can be effected by those skilled in the art without departing from the spirit and scope of the invention as defined in the appended claims.

We claim:

1. A cutting-welding torch comprising a handle assembly, a gaseous fuel needle valve in said handle assembly, means for connecting a source of gaseous fuel under pressure with said fuel needle valve, an oxygen needle valve in said handle assembly, means for connecting a pressurized source of oxygen with said oxygen needle valve, a high pressure oxygen valve in said handle assembly, means for connecting said high pressure oxygen valve with said pressurized source of oxygen, a cutting tip adapted for demountable attachment to said handle assembly, said cutting tip comprising a mixing head, means for connecting said mixing head with each of said fuel and oxygen needle valves and said high pressure oxygen valve, a welding tip adapted for demountable attachment to said handle assembly, said welding tip including a mixer, connecting means for connecting said fuel and oxygen needle valves to said mixer, and means in said welding tip for blocking flow from said high pressure oxygen valve when said welding tip is attached to said handle assembly.

2. The invention as claimed in claim 1 wherein said handle assembly comprises a body portion containing said fuel and oxygen needle valves and said high pressure oxygen valve, fuel and oxygen supply tubes extending between said body and an end member spaced therefrom, fuel and oxygen passages in said end member, means for connecting said supply tubes and fuel and oxygen hoses to said end member passages, and a handle tube surrounding said supply tubes extending between said body and said end member.

3. The invention as claimed in claim 1 wherein said handle assembly comprises a body portion containing said fuel and oxygen needle valves and said high pressure oxygen valve, a stepped bore in said body, means on each said cutting and welding tips adapted for cooperative engagement with said stepped bore in said body to provide three separate chambers therebetween, passage means in said body connecting each of said fuel and oxygen needle valves and said high pressure oxygen valve with a separate one of said chambers, conduit means in said cutting tip for connecting each of said chambers with said mixing head, and conduit means in said welding tip for connecting said fuel needle valve and said oxygen needle valve with a mixing passage in said mixer.

4. The invention as claimed in claim 1, wherein said fuel and oxygen needle valves and said high pressure oxygen valve are disposed in closely spaced relationship in said handle assembly.

* * * * *